United States Patent Office 3,105,484
Patented Oct. 1, 1963

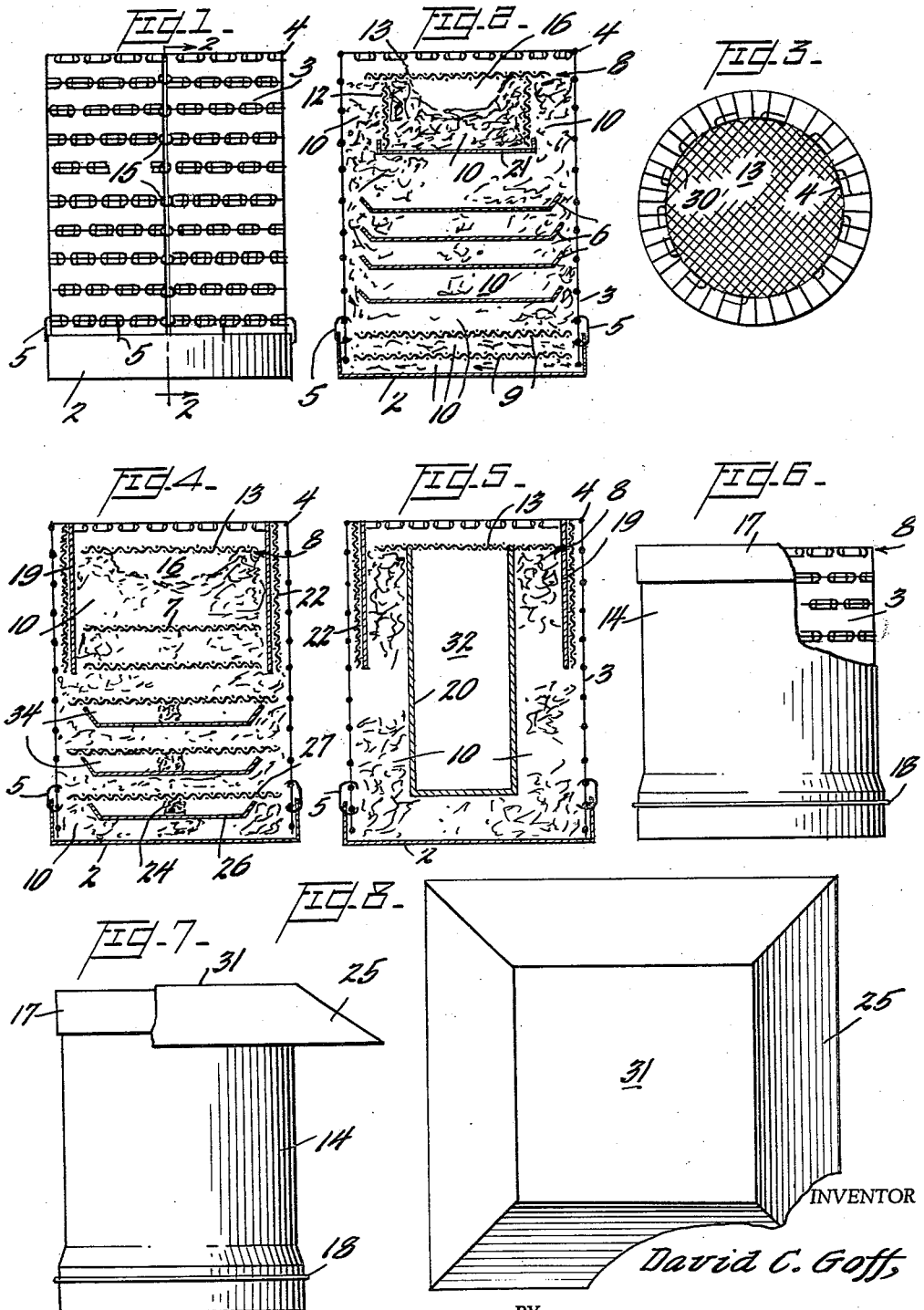

3,105,484
HEATER
David C. Goff, 729-C NE. 16th Ave.,
Fort Lauderdale, Fla.
Filed Oct. 14, 1959, Ser. No. 846,476
8 Claims. (Cl. 126—59.5)

The present invention pertains to heaters or stoves for outdoor use, primarily, and particularly to improvements in the designs and structures of such heaters themselves, and in the methods of producing and efficiently operating them.

There is a need in many parts of the country for heaters or stoves to inject heat into citrus groves, fruit orchards, or vegetable farms, to provide protection against damages by freezing or frost to the crop or the trees or plants themselves. One of the primary purposes of my present invention is to provide a heater which will more economically and effectively provide this protection. Its use, however, is by no means confined to agriculture solely.

It is a well-known fact that the sun during the daytime warms the surface of the earth, and heat is stored within the earth itself. By radiation, the earth heat warms the trees and vegetation on the earth. After the sun goes down, the upper air becomes chilled and the earth begins to give up more of its heat by radiation to the sky, since the flow is from the warm to cold body. It is also known that cold air will settle, as it is heavier, and displace warm air, and the lighter warm air will tend to rise. These factors sometimes operate to bring about the frost or freezing conditions which endanger the crops, fruit trees or plants.

The function of heaters, stoves, or so-called "fire-pots" is to replace the lost heat close to the earth. To do this economically has always been a great problem. A number of factors complicate this heating problem. Among these are temperature inversion (large or small), wind velocity, high or low land, etc.

Inasmuch as warm air tends to rise and cold air to settle, by midnight or earlier, the air at earth level and the plant life is colder than the upper air. This is the reverse of the daytime conditions. Where the upper air is considerably warmer than the ground level air and where the cold air extends only a relatively short distance above the earth, the condition is known as a "large inversion." Where there is a high ceiling of warm air or a "small inversion," the heating problem is more difficult. To further complicate the artificial heating problem is the wind velocity and cold air drift. In low ground or small valleys, cold air drifts in and settles more rapidly, whereas adjacent high ground may stay warmer as it is closer to the warm upper air, and is warmed by natural or forced convection.

In practically still clear air (1–2 m.p.h.), the cold air settles to the earth producing a frosting or freezing condition. However, if there is a wind (5–10 m.p.h.) and a large inversion, the upper warm air and lower cold air are mixed and the earth is heated by forced convection. A wind with a small inversion brings in more cold air and complicates the heating problem.

Conductance, convection (natural or forced) and radiation are the three ways to transfer heat, and these are involved to some degree in the heaters presently in use. The commonly used stack heater entails heat transfer almost altogether by radiation and convection. This device comprises a large round metal oil container, approximately 20" in diameter by 12" high. Above this is a louvered mixing or combustion chamber and on top of which is a stack, making the total height of the heater about three to four feet. A heater of this kind is an efficient burner; but the hot gases are expelled upward through the stack and quickly rise to high levels, where the gasses are beyond the range within which they can be useful in nature or forced heating by convection at ground level. The stack becomes red hot and gives off heat by radiation, but the radiating surface is small. The bottom of the device is cold and transfers virtually no heat by conductance or radiation.

This stack heater is relatively expensive and costly to operate and maintain. Other types of heaters which produce a flame through the stack provide some heat transfer by convection and less by radiation through the stack, and virtually no heat by conductance.

My invention provides a simple, inexpensive device intended to produce heat where needed (principally out of doors) by utilizing to a maximum the three heat transfer methods—conductance, convection and radiation, and at the earth level. It is sturdy of construction and may be operated many times. It is less costly and more economical to operate than the heaters heretofore used.

It is generally known that intense heat and violently burning gases will rise very quickly into the cold upper air at night—in fact too quickly to be of value in warming the ground or air close to it. It is therefore understood that a more modestly burning heater, with less rapid rise of heat to the upper cold air, and more coverage of ground area due to its economy, will produce a more satisfactory and desired result. My new heater will give this desired result.

A heater according to one form of my invention is illustrated in the accompanying drawings, and described in detail below. It will be understood that this is exemplary only, and that the heater may take many different forms and still encompass the invention which is defined in the appended claims.

In the drawings:

FIGURE 1 is a side elevational view of one form of heater without top cover and before top has been completely formed.

FIGURE 2 is a vertical sectional view along line 2—2 of FIGURE 1 showing one form of heater and before the top has been completely formed.

FIGURE 3 is a top plan view of the same heater with the top cover removed to show the construction of the top of the heater when it has been formed.

FIGURE 4 is another form of heater in vertical section and before the top has been completely formed. The top may also be formed as in FIGURE 3.

FIGURE 5 illustrates another form of heater in vertical section and before the top has been completely formed. Here also the top may also be formed as in FIGURE 3.

FIGURE 6 is a side elevational view of the completely formed heater with the waterproof wrapper in place around the body of the heater, and the top cover in place.

FIGURE 7 is a side elevational view of the completely formed heater with the top cover in place and a partial elevational view of the radiating hood in place over the top of the completely formed heater.

FIGURE 8 is a top plan view of one form of hood which may be used with all forms of my heater.

In general, a heater according to my invention is preferably cylindrical in shape but can be made in any desired size of heat-producing capacity. To simplify the description, I shall describe with reference to FIGURES 1–5 a heater which is 16" in diameter by 22" high. Referring to FIGURE 2, it may be seen that the bottom of the heater comprises a metal pan 2, into which I staple a cylindrical basket made of paper-backed wire mesh 3 (as plaster lath). Other mesh or material with openings provided may be used if desired. The basket or structural container may be made with any fine mesh openings, so granular or small particle size fillers may be used in lieu of a fibrous filler as rock wool or mineral wool. Rock wool as used in the following descriptions refers to any suitable and available filler of the same nature. Into this basket assembly I pack rock wool or mineral wool 10. The heater is designed to produce flame around the lower half of the outside surface close to the earth. The device is wrapped in a waterproof paper 14 (as sisalkraft paper) and a metal pan 17 is placed over the top. The flat-topped and flat-bottomed heater may be stacked outdoors until ready for use.

When ready for use, the top is removed and ordinary burning or fuel oil is poured into and absorbed by the non-combustible filler in the wire mesh container. It may be fired by lighting the outside paper cover with a match or torch. It may be used many times or burned continuously by adding new oil when the flame is low.

The burning produces a flame around the entire periphery of the bottom half of the device or, preferably, approximately 12" above the earth.

There is no combustion chamber or metal enclosure to hold the fuel oil, but rather the filler material functions primarily to hold the oil, and release it for burning. The whole outside of the device becomes hot and transfers heat by radiation. The bottom of the heater, resting on the earth, is hot and transfers heat under and around it to the earth by conductance. The flames produce a natural convected heat and a forced convection if there is moving air. By the simple expediency of placing a hood over the top of the flat metal top of the burner, with an overhang of preferably a foot or more, heat may be confined closer to the earth for a longer time and absorbed by the earth. In addition, the hood becomes hot and serves to radiate heat, the angle of overhang of the hood being such that this radiation is directed at the trees.

By this means, described generally above, there is provided a large radiating surface, aside from the hood, to give up heat due to the entire surface area of the heater being hot, as well as the surface area of the adjacent heated ground.

There are many safe, non-toxic, non-inflammable materials capable of holding large amounts of oil which may be employed as a filler material. Among these are rockwool, mineral wool, glass wool, vermiculite, perlite, slag, light-weight porous concretes, etc., or any porous, non-combustible material as, for example, asbestos or gypsum. These may be used singly or in combination. Powders or clays (as bentonite) may be mixed with the materials to provide a coagulant to improve oil-holding properties.

Mixtures of filler with powdered pitch, asphalt, bitumens, Gilsonite, carbon (as in old "ground-up" rubber tires), ground paper, saw dust, wood chips, etc. are useful, since these latter serve to aerate the non-combustible mass for better burning upon being consumed and at the same time add fuel for the burning.

The oil storage capacity of a burner and the rate of burn, and the rate of oil absorption, will depend largely upon the density of the non-combustible filler material and the amount of internal aeration or venting built into it, and the density of the filler may be varied as desired with these factors in mind.

Although various materials or combinations of materials can be used in my burner, and it may be built to any dimensions, the drawings will show a typical construction and one which I find is economical and efficient.

Turning now to the accompanying drawings, I show presently preferred embodiments of the invention in detail to enable those acquainted in this art to readily understand the invention and the advantages and benefits accruing from its employment. Like reference numerals have been used to designate the same parts throughout the several views.

In referring to the drawings, it will be noted that the round metal pan 2 (FIGURE 1) has been stamped or formed from metal of suitable gauge to be lasting and is preferably galvanized. Paper-backed wire mesh 3 as used in plaster lathing, has been rolled into a cylindrical shape, and its vertical edges have been joined together firmly by means of clips or fasteners 15 to provide a basket. One end of the open-ended wire basket which is about equal in diameter to that of circular pan 2 is inserted into pan 2 and firmly fixed by means of simple clips or fasteners 5. The side walls of pan 2 need not be over 30" to 5" in height to give it rigidity and strength. Pan 2 of 16" diameter and 4" height is large enough for a heater of five-gallon oil capacity. A pan 18" to 20" in diameter and with 8" to 10" walls is of sufficient size for a heater of 15 to 20-gallon oil capacity.

FIGURE 2 shows the construction of one form of my heater. Mineral wool or rockwool filler (for sake of brevity hereinafter referred to as filler) 10 is packed firmly into pan 2. Usually inorganic, non-combustible fillers are also good insulators so the high degree of heat generated at the side of the heater does not penetrate very far into the interior of the heater. Usually also, those fillers have good capillary or wicking action whereby the interior oil is conveyed to the outside surface of the heater for burning. However, to assist in this action, circular discs of heat-conducting materials (as expanded diamond mesh metal lath as used in plastering) may be embedded into the filler 10. I find one or more of these discs 9 will introduce heat by conductance into the interior of the heater and it will thin out or gasefy the oil and thereby help to efficiently and completely burn out all of the oil stored within the filler 10. Also, the discs 9 will tend to help hold the fuel oil for long periods of time within filler 10. Also, I find embedding metal pans (as "pie pans") 6 is useful in distributing the fuel oil more evenly throughout filler mass 10. One or more pans 6, which may be perforated, serve also to introduce heat into the center of filler mass 10 as does disc 9. As the mass of fuel oil is poured into the top of the heater, FIGURE 2, it will penetrate the filler and flow downward. It will flow through and/or around the edges of pans 6. It will be evenly distributed through filler 10 and will after several hours be absorbed into and retained by the whole mass of filler 10. Again, the use of pans 6 will not allow gas formed by conducted heat in the center of filler 10 to be dissipated through a great area of filler 10, but will tend to direct it to the side surface of the heater for burning.

FIGURE 2 shows a wire mesh cylinder 12 in the upper portion of the heater, embedded in filler 10. The top of the cylinder is at the same elevation as the top of filler 10 at point 8. A perforated sheet (as aluminum) 21 may be placed beneath the lower end of this cylinder 12, as shown. Filler 10 is compressed into cylinder 12 but a substantial void or cavity 16 is left in the upper half of cylinder 12 as shown. Over the top of cylinder 12 and void 16, and coincidentally at the same level over the top edge of filler 10, is placed a circular wire mesh disc 13. This disc 13 serves as a multi-purpose device. Firstly, it is an anti-splash device and prevents oil, when poured, from running outward toward the side of container 3 or splashing upward. The oil will be quickly directed into cavity 16. Another purpose of disc 13 will be shown presently in connection with FIGURE 3.

In FIGURE 2, the filler 10 may be compacted to the top edge of container 3. However, I find as shown in FIGURES 2 and 3, a more substantial top structure for my heater can be built. The filler 10 is placed to 8, FIGURE 2, or approximateily two and one-half inches from the top of container's top edge 4. The distance between 4 and 8 is the distance between the two top horizontal wires of paper backed wire mesh container 3. This distance may vary, but is usually less than the radius of circular container 3.

In FIGURE 3, I show the top edge of container 3 (which is the distance between 4 and 8, FIGURE 2) bent inward and downward over wire mesh disc 13.

Before bending downward to a flat position parallel with disc 13, I cut the top strand of wire 4 in several places around the circumference of circular container 3 as at 30, FIGURE 3, which is at a point midway between where two vertical wires meet the top strand of horizontal wire. The short ends of the cut wire, I press into the mesh openings in disc 13. Thus is formed an interlocking of the top section of wire mesh container 3 and wire mesh disc 13, which results in a strong structure at the top of the heater.

It must be understood, to be effective and economical, the above-described heater, which is relatively small in volume and weighing approximately 30 pounds, must quickly and uniformly absorb five gallons of fuel oil (40 pounds), must effectively hold the fuel oil for a long period of time, and must burn for a long length of time. I find the above-described heater will absorb five gallons of #1 or #2 diesel fuel oil in less than three minutes, will retain the fuel oil within the filler for a long period of time, and will burn for a minimum time of eight hours.

This heater may be built to larger dimensions, which will result in a greater oil storage capacity and a greater length of burning time. Conversely, it may be built to smaller dimensions, with a lessened oil storage capacity and length of burning time.

FIGURE 4 shows another way to effectively build my heater. As in FIGURES 1 and 2, filler 10 is pressed firmly and densely into pan 2 in FIGURE 4. It may be seen that this bottom portion of filler 10 is pressed into a saucer-shaped pattern. A circular thin sheet (as aluminum) 26 is then placed in the concavity formed in the filler and the edge of the sheet extends to within approximately two inches of the container walls. A circular disc of wire mesh 27 covers the lined depression in filler 10 and thus provides an aerating cavity or void 34. All sides of disc 27 rest on firmly packed filler 10 a short distance from the outer surface of the heater. Disc 27 may be further supported by a small block of compressed mineral wool 24 which is placed in the center of depression as shown in FIGURE 4. I find one or more of these aerating cavities 34, located in the lower half, provide a means to introduce sufficient oxygen from the outside to the center of filler 10 to burn out virtually all of the oil. There are other satisfactory means to aerate the center of filler 10 and the positioning may be different, but I find the described arrangement to be effective.

After the aerating or other devices have been formed or placed, the remainder of the basket or container may be filled. In the course of doing this I place one or more wire mesh discs 7 in the filler 10. I find as with coagulant additives, this helps to hold oil in the filler mass 10. Before the filler 10 is placed in the upper half of the heater, I place one or more layers of either wire mesh 22 or thin sheet (aluminum) 19, or both, against the inside wall of the wire mesh container or basket wall. This sheet 19 or 22 extends downwardly into the container approximately six inches and the top edges are placed approximately at the top of container at 4.

Filler 10 may be carried to the top of container, or the top of FIGURE 4 may be constructed as in FIGURE 3. Sheets 19 and 22 would then be bent inward with the top edge of the container as in FIGURE 3. Sheets 19 and 22 help to evenly distribute the oil downward and at the same time prevent any burning on the sides of the heater at the area it covers.

Another form of my new heater is shown in FIGURE 5. This also shows the wire basket 3, the bottom pan 2 with this latter fastened by clips 5. Filler 10 is also compressed into the pan. As the filler 10 is placed into the wire mesh container, a core-like opening or void 32 may be built into the heater by use of cylindrical basket 20 which may be made of wire mesh or aluminum sheet or perforated metal sheets. Oil may be poured into this opening 32 to fuel the heater and it also serves to aerate the filler in the center. Fuel is absorbed by filler 10 and burns out at the side walls of the heater. This opening 32 (of varying sizes) may also be formed by filling the container 3 with filler 10 by tremendous hydraulic pressure so the filler is a dense mass, and then by means of a coring device remove a core of filler 10 from the top of the heater downward. Sheets 19 and 22 may also be used in this heater if desired, as well as the other devices described above. The top enclosure of heater in FIGURE 5 may be constructed as in FIGURE 3, if desired.

FIGURE 6 shows a partial elevational view of a completed heater. Heavy waterproof wrapper around the body of the heater is shown as 14. This cover may be made of paper (as sisalkraft). It will prevent any entrance of water into the heater before all or part of the fuel oil is poured in, even though the heater is stored out-of-doors. Also, it will give an attractive appearance to the heater. I place a band, strap, or wire 18 around the bottom of the heater to help prevent distortion of the wrapper or heater through accidents or mishandling. A typical paper-backed wire mesh from which the basket 3 is formed may be made of vertical and horizontal wires of suitable gauge which have been spot-welded at the points where the wires intersect and heavy kraft paper is interwoven between the wires. I find "K" lath which is a commonly used lath in the plastering trade will fill the requirements satisfactorily, although there are many types of mesh on the market that may be used. The metal top cover 17 is shown in place over the top of the heater in FIGURE 6. This top may be kept permanently in this position except when fuel is being placed into the heater.

FIGURE 7 shows a partial elevational view of a heater with a radiating hood 31, which has an overhang 25 disposed at an angle to direct radiated heat at the ground or trees and plants. The hood with its overhang serves to prevent heat from rising too rapidly to the upper air, but rather tends to direct it along the ground so its energy may be better utilized. When hood 31 is placed over the heater top 17, a shovel or two of sand or earth may be placed on top of the hood to prevent it from being blown off by the wind. There is little or no danger of the heater itself being blown over by a strong wind, due to its weight, contour, and short height.

The hood 31 with overhang 25 as shown in FIGURE 8 may be made of various materials and in various forms. Even its use is optional, but I find that its use tends to help the heater operate more efficiently.

My heater is attractive in appearance, low in original cost, easy to operate, and requires little if any maintenance. They may be stacked one over the other, filled with fuel or unfilled, for long periods of time when exposed to the elements. After a burning season, new waterproof paper covers may be placed around the heaters and they may be stacked (one over another) close by to the point of use, until again needed. The heater may be burned many times. The metal hood may be inverted and placed on the ground (as a pan), and the heater may be placed into the pan, and dragged (as a sled) under a tree in the groove or orchard until again needed. There is little maintenance and handling cost. On the other hand, the more costly metal stack-type heaters must be hauled to a central storage area. There the combustion and oil storage chambers must be cleaned of carbon. The metal stack must be repaired and cleaned. The cost of maintenance and handling is much greater with this type of heater than that provided by the present invention.

Its uses are varied and many. It may be used with little smoke or heavy smoke, depending on the type of fuel burned, or additives used in the fuel. It may be used wherever outside heat is required and in some special indoor uses.

Although various details of structure have been set forth herein, it is understood that they are merely by way

What I claim is:

1. A reusable heater comprising a container, a non-combustible, porous, inorganic filler within the container, said container having openings in its side walls to expose at least a portion of said filler, whereby the burning of fuel carried by said filler occurs at least in part on the side walls of the container.

2. A reusable heater comprising a container, a non-combustible, porous, inorganic fuel absorbent filler within the container, said container having openings in its side walls to expose at least a portion of said filler to the atmosphere, whereby the burning of fuel absorbed in said filler occurs principally on the outer side walls of the container.

3. A heater as claimed in claim 1 in which said filler is a porous, liquid absorbent, non-combustible, insulating material which retains fuel oil for burning on the outer surface of the heater, and which insulates against the transmission of heat to fuel oil contained inwardly thereof, whereby the interior of the heater remains relatively cool and unaffected by the burning on the outside surface of the heater.

4. A heater as claimed in claim 3 in which said filler is a porous, liquid-absorbent, non-combustible material which retains fuel oil for burning on the outer surface of the heater, the interior of the heater remaining relatively unaffected by said burning even when heat is introduced into the interior by means of conductance from the surface burning to thin out and gasify the interior oil for complete and efficient multiple burnings through the outer surface of the heater.

5. A heater as claimed in claim 4 in which heat is introduced by conductance from the surface burning to the interior of the heater by means of metal or other heat-conducting material, extending from approximately the outer surface of the heater approximately to or through the center of the heater.

6. A heater as claimed in claim 1 in which one or more perforated metal pans are horizontally placed in the heater, said pan or pans allowing fuel oil to pass from the upper oil storage area to the bottom surface burning area but not allowing interior gases to be diffused through the upper filler mass and directing said gases to the surface area of the bottom portion of the heater, for burning.

7. A heater as claimed in claim 1 in which said filler is, at least in major part, rock wool.

8. A heater as claimed in claim 1 in which said filler is, at least in major part, mineral wool.

References Cited in the file of this patent

UNITED STATES PATENTS

| | | |
|---|---|---|
| 803,662 | Brown et al. | Nov. 7, 1905 |
| 814,646 | Griffiths | Mar. 6, 1906 |
| 1,152,674 | Von Hohenstein | Sept. 7, 1915 |
| 1,293,507 | Money | Feb. 4, 1919 |
| 1,536,792 | Howard et al. | May 5, 1925 |
| 1,650,148 | Nathan | Nov. 22, 1927 |